(12) United States Patent
Aradachi

(10) Patent No.: US 8,841,880 B2
(45) Date of Patent: Sep. 23, 2014

(54) BATTERY CHARGER WITH CHARGE ABNORMALITY CHECKING FUNCTION

(75) Inventor: Takao Aradachi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 439 days.

(21) Appl. No.: 12/916,139

(22) Filed: Oct. 29, 2010

(65) Prior Publication Data

US 2011/0101911 A1    May 5, 2011

(30) Foreign Application Priority Data

Oct. 29, 2009  (JP) ................................. 2009-249139

(51) Int. Cl.
*H02J 7/00* (2006.01)
*H02J 7/04* (2006.01)

(52) U.S. Cl.
CPC ............. *H02J 7/0031* (2013.01); *H02J 7/0021* (2013.01); *H02J 7/007* (2013.01); *H02J 7/0027* (2013.01); *H02J 7/0004* (2013.01)
USPC ............ 320/107; 320/106; 320/137; 320/162

(58) Field of Classification Search
USPC ......... 320/107, 116, 117, 108, 111, 112, 113, 320/114, 115, 134, 135, 136, 137; 324/500, 324/425, 426, 427, 428
See application file for complete search history.

(56) References Cited

U.S. PATENT DOCUMENTS

| | | | |
|---|---|---|---|
| 5,675,236 A | 10/1997 | Nakanishi | |
| 5,731,683 A * | 3/1998 | Nakanishi | ..................... 320/111 |
| 6,278,261 B1 | 8/2001 | Sakakibara | |
| 6,534,951 B2 | 3/2003 | Kawashima | |
| 6,617,826 B2 * | 9/2003 | Liao et al. | ...................... 320/118 |
| 7,365,515 B2 * | 4/2008 | Takano et al. | .................. 320/116 |
| 7,439,708 B2 | 10/2008 | Aradachi et al. | |
| 7,518,341 B2 | 4/2009 | Wang et al. | |
| 7,592,780 B2 | 9/2009 | Funabashi et al. | |
| 7,733,060 B2 * | 6/2010 | Kojima | .......................... 320/125 |
| 8,093,859 B2 | 1/2012 | Aradachi et al. | |
| 2006/0028179 A1 * | 2/2006 | Yudahira et al. | .............. 320/133 |
| 2006/0244420 A1 * | 11/2006 | Stanesti et al. | ................ 320/128 |

(Continued)

FOREIGN PATENT DOCUMENTS

| | | | |
|---|---|---|---|
| CN | 1767312 A | 5/2006 | |
| CN | 1794001 A | 6/2006 | |

(Continued)

OTHER PUBLICATIONS

Office Action from China Intellectual Property Office for application CN201010531530.0 (Mar. 26, 2013).

(Continued)

*Primary Examiner* — Edward Tso
*Assistant Examiner* — Alexis Boateng
(74) *Attorney, Agent, or Firm* — Kilpatrick Townsend & Stockton LLP

(57) ABSTRACT

A battery charger has an abnormal condition checking function for checking unintentional or accidental charging of a secondary battery. A charge circuit charges the battery when a switching element interposed between a power source and the battery is turned on. Current which may flow in the charge circuit is detected when the battery is not to be charged by turning the switching element on. When the current is detected in such a condition, an abnormality signal is produced to cause the charge circuit to be disabled.

7 Claims, 2 Drawing Sheets

(56) References Cited

U.S. PATENT DOCUMENTS

| | | | |
|---|---|---|---|
| 2008/0122400 A1* | 5/2008 | Kubota et al. | 320/106 |
| 2008/0231236 A1* | 9/2008 | Watanabe et al. | 320/150 |
| 2008/0252265 A1* | 10/2008 | Kokubun et al. | 320/162 |
| 2008/0253053 A1* | 10/2008 | Formenti | 361/111 |
| 2009/0108804 A1 | 4/2009 | Aradachi et al. | |
| 2010/0039071 A1* | 2/2010 | Hansford et al. | 320/162 |
| 2010/0060232 A1* | 3/2010 | Boyles et al. | 320/107 |

FOREIGN PATENT DOCUMENTS

| | | |
|---|---|---|
| CN | 100413175 C | 8/2008 |
| JP | 07-322513 A | 12/1995 |
| JP | 2001-136675 A | 5/2001 |
| JP | 2002-191129 A | 7/2002 |
| JP | 2004-187366 A | 7/2004 |
| JP | 2004-343850 A | 12/2004 |
| JP | 2005-333708 A | 12/2005 |
| JP | 2009-106117 A | 5/2009 |
| JP | 2009-178012 A | 8/2009 |

OTHER PUBLICATIONS

Japan Patent Office office action for patent application JP2009-249139 (Nov. 12, 2013).

Second Office Action from China Intellectual Property Office for application CN201010531530.0 (Nov. 13, 2013).

* cited by examiner

BATTERY CHARGER WITH CHARGE ABNORMALITY CHECKING FUNCTION

CROSS REFERENCE TO RELATED APPLICATION

This application claims priority from Japanese Patent Application No. 2009-249139 filed Oct. 29, 2009. The entire content of the priority application is incorporated herein by reference.

BACKGROUND

1. Field of the Invention

The present invention relates to a battery charger for charging rechargeable (secondary) batteries.

2. Description of the Related Art

Japanese Patent Application Publication No. 2004-187366 discloses a battery charger in which a switching element, such as a relay, is interposed in an output line connecting a switching power source and the rechargeable battery. When charging the battery is not performed, the switching element is turned off. Thus, the battery is disconnected from the output line and placed in a charge disabled condition. The battery is not supplied with power from the switching power source until the charging operation is commenced. Power supply to the battery is not performed after the charging operation is complete.

SUMMARY

However, notwithstanding the fact that the battery charger is in the charge disabled condition, the battery may accidentally be supplied with power from the switching power source, resulting in proceeding unintentional charging of the battery. Such an accidental charging may occur due to malfunction of the battery charger.

An unintended charging of the battery can be prevented if microcomputer-controlled battery chargers are configured to have an automatic time-up charge stop function. Specifically, a timer provided in the microcomputer is set to time up when a predetermined period of time has elapsed from the commencement of charging, and the charging operation is stopped in coincidence with time-up of the timer.

However, such a solution to the above-noted problem is not available to the battery chargers with no microcomputer built therein. Such battery chargers are generally less expensive than microcomputer-controlled battery chargers. Modifying the inexpensive battery charges to have a microcomputer for the purpose of achieving the automatic time-up charge stop function increases the cost of the battery charger.

Not only the battery charger but also the battery may have a malfunction or abnormality. Abnormality check of the battery has conventionally been performed during the charging operation based on a charge voltage or charge current supplied to the battery. Thus, the abnormality of the battery cannot be discovered before the commencement of the charging operation. It is desirable that the abnormality of the battery be discovered before the commencement of the charging operation.

In view of the foregoing, it is an object of the invention to provide a battery charger to which a battery charge abnormality checking function can be added at low cost.

Another object of the invention is to provide a battery charger that is capable of discovering the abnormality of the battery under a charge stop condition or prior to commencement of the charging operation.

To achieve the above and other objects of the invention, there is provided a battery charger including a battery connecting section, a charge circuit, a current detecting section, and a signal outputting section. A secondary battery to be recharged is connectable the battery connecting section. The charge circuit is configured to charge the secondary battery. The current detecting section is configured to detect current flowing in the charge circuit when charging the secondary battery has been stopped. The signal outputting section is configured to output an abnormality signal when the current detecting section detects the current.

The battery charger may further include an interrupting section configured to interrupt power supply to the charge circuit based on the abnormality signal output from the signal outputting section. Also, it may further include a battery detecting section configured to detect that the secondary battery is connected to the battery connecting section. The current detecting section detects the current flowing in the charge circuit when detection made by the battery detecting section indicates that the secondary battery is not connected to the battery connecting section. Further, there may be provided a temperature detecting section for detecting temperature of the secondary battery, and a charge stop section for stopping charging the secondary battery depending upon the temperature detected by the temperature detecting section. In this case, the current detecting section detects the current flowing in the charge circuit when the charge stop section stops charging the secondary battery.

According to another aspect of the invention, there is provided a battery charger including a battery connecting section, a charge circuit, a charge changeover section, a current detecting section, a current detecting section, and a signal outputting section. A secondary battery to be recharged is connectable to the battery connecting section. The charge circuit is configured to charge the secondary battery. The charge changeover section is configured to changeover a charge condition to a charge stop condition and vice versa wherein the secondary battery is charged by the charge circuit in the charge condition whereas the secondary battery is not charged in the charge stop condition. The current detecting section is configured to detect current flowing in the charge circuit when the charge condition is changed over to the charge stop condition by the charge changeover section. The signal outputting section is configured to output an abnormality signal when the current detecting section detects the current.

The battery charger may further include an interrupting section configured to interrupt power supply to the charge circuit based on the abnormality signal output from the signal outputting section.

The battery charger may further include a battery detecting section configured to detect that the secondary battery is connected to the battery connecting section, wherein the charge changeover section changes over the charge condition to the charge stop condition when detection made by the battery detecting section indicates that the secondary battery is not connected to the battery connecting section.

The battery charger may further include a temperature detecting section configured to detect temperature of the secondary battery, wherein the charge changeover section changes over the charge condition to the charge stop condition depending upon the temperature detected by the temperature detecting section.

According to yet another aspect of the invention, there is provided a battery charger including a switching power source, a charge on/off determining circuit, a charge current detecting circuit, and a disabling section. The switching power source supplies power to a secondary battery to be recharged. The charge on/off determining circuit determines whether to charge the secondary battery based on qualitative information of the secondary battery. The charge current detecting circuit detects charge current supplied to the secondary battery for recharging. The charge current detection controlling section is configured to control the charge current detecting circuit so that detection of the charge current is to be executed or not. The disabling section disables the switching power source when the charge current detecting circuit detects the charge current. When the charge on/off determining circuit determines to charge the secondary battery, the charge current detection controlling section does not allow the charge current detecting section to perform detection of the charge current whereas when the charge on/off determining circuit determines not to charge the secondary battery, the charge current detection controlling section allows the charge current detection section to perform detection of the charge current.

Preferably, the qualitative information is information about temperature of the secondary battery.

According to yet another aspect of the invention, there is provided a battery charger including a battery connecting section to which a secondary battery to be recharged is connectable, a charge circuit configured to charge the secondary battery, a current detecting section configured to detect current flowing in the charge circuit, a charge changeover section configured to changeover a charge condition to a charge stop condition and vice versa wherein the secondary battery is charged by the charge circuit in the charge condition whereas the secondary battery is not charged in the charge stop condition, a current detection controlling section configured to allow the current detecting section to detect the current flowing in the charge circuit when the charge condition is changed over to the charge stop condition by the charge changeover section, and a signal outputting section configured to output an abnormality signal when the current detecting section detects the current.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
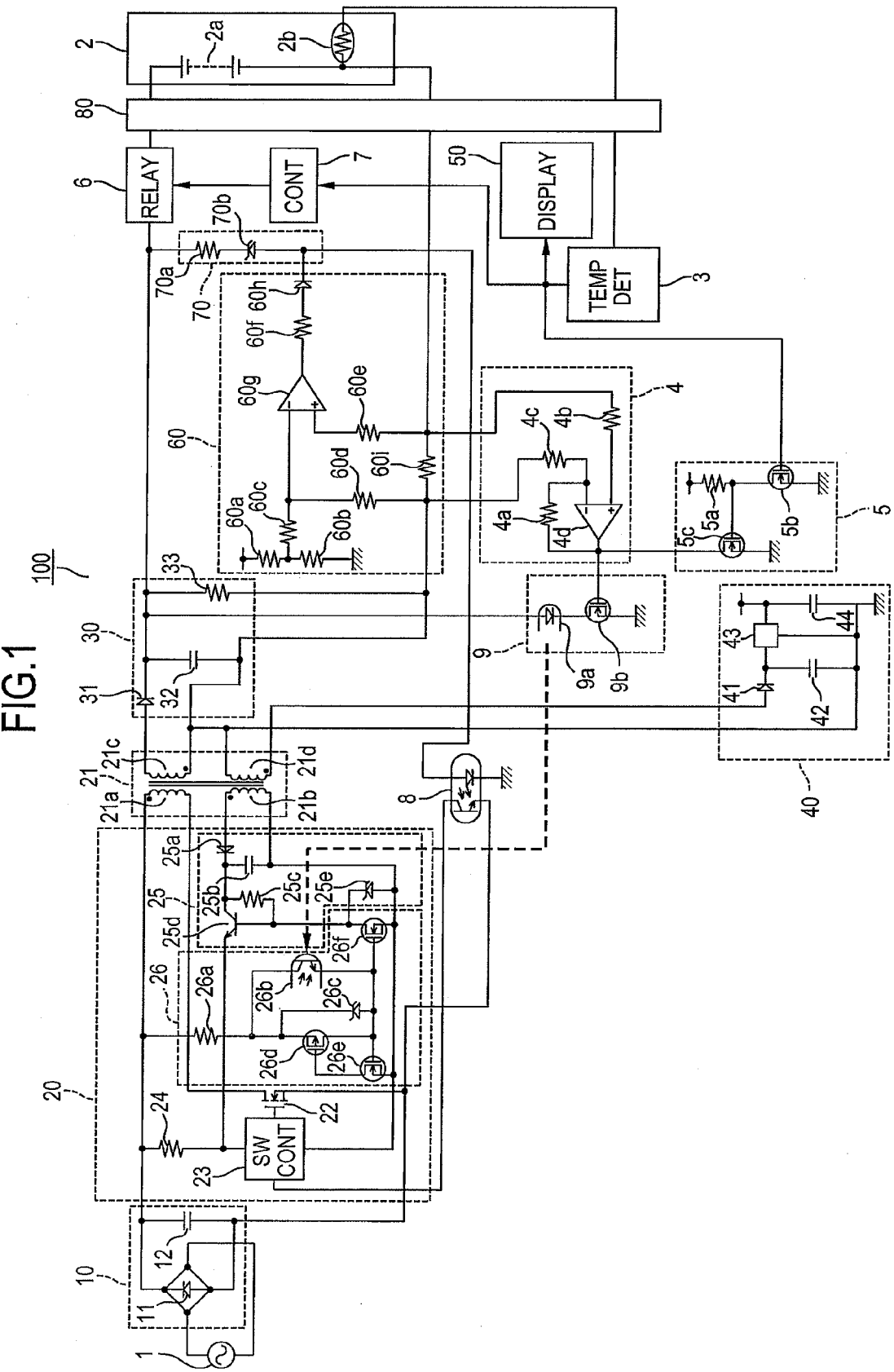
FIG. 1 is a circuit diagram showing a battery charger according to one embodiment of the invention.

A battery charger 100 according to one embodiment of the invention will be described with reference to the accompanying drawings.

In this embodiment, the battery charger 100 is used for charging a battery pack 2. The battery charger 100 has a battery connecting section 80 to which the battery pack 2 is connectable. The battery pack 2 contains a plurality of rechargeable or secondary battery cells 2a connected in series (hereinafter referred to as "battery 2a"), and a thermistor 2b. The battery 2a and the thermistor 2b are connected to the corresponding terminals of the battery charger 100 when the battery pack 2 is connected to the battery connecting section 80. In the battery pack connected state, one terminal of the thermistor 2b is connected to the negative terminal of the battery 2a and another terminal thereof to a battery temperature detecting section 3 through the battery connecting section 80. As is well known in the art, a thermistor is a type of resistor whose resistance varies significantly with temperature and is used as temperature sensors.

The battery temperature detecting section 3 is provided for detecting temperature of the battery 2a and configured, in this embodiment, to selectively output a low-level signal and a high-level signal depending upon the temperature indicated by the thermistor 2b. The high-level signal is output when the battery temperature is high or above a predetermined value whereas the low-level signal is output when the battery temperature is low or equal to or below the predetermined value. Output of the low-level signal indicates permission of charging. On the other hand, output of the high-level signal indicates prohibition or stoppage of charging. While the temperature detecting section 3 according to this embodiment is configured as described above, it may be configured to output a signal only when the battery temperature is above the predetermined value. Conversely, a signal may be output from the temperature detecting section 3 only when the battery temperature is equal to or below the predetermined value.

The battery charger 100 includes a charge current detecting section 4 which is configured from resistors 4a, 4b, 4c and an operational amplifier 4d. The operational amplifier 4d has an inverting input terminal connected to one terminal of a shunt resistor 60i through the resistor 4c and a non-inverting input terminal connected to the other terminal of the shunt resistor 60i through the resistor 4b. The resistor 4a is connected in a feedback path between the output terminal and the inverting input terminal of the operational amplifier 4d. Voltage is developed across the shunt resistor 60i corresponding to charge current flowing therein. The voltage developed thereacross is subjected to inversion amplification with the operational amplifier 4d, and the resulting signal is output from the current detecting section 4. That is, when the charge current is flowing, a signal representing the level of the charge current is produced from the charge current detecting section 4 whereas when the charge current is not flowing, no output is obtained from the charge current detecting section 4.

A charge current detection controlling section 5 is provided in association with the charge current detecting section 4. The charge current detection controlling section 5 is configured from a resistor 5a, and N-type FETs 5b, 5c. The output terminal of the temperature detecting section 3 is connected to the gate of the FET 5b. The FET 5b has a drain connected to a power supply through the resistor 5a and a source connected to ground. The FET 5c has a gate connected to a junction between the resistor 5a and the FET 5b, a drain connected to the output of the charge current detecting section 4, and a source connected to ground.

As described above, the high-level signal is output from the battery temperature detecting section 3 when charging the battery 2a is not permitted due to high temperature of the battery 2a. This high-level signal is applied to the gate of the FET 5b, thereby rendering the same ON. As a result, the FET 5c is rendered OFF. Accordingly, when the charge current detecting section 4 detects the charge current, the section 4 can output a signal representing the level of the charge current. On the other hand, when charging the battery 2a is permitted as the battery temperature is equal to or lower than the predetermined value, the temperature detecting section 3 outputs the low-level signal. This low-level signal is applied to the gate of the FET 5b, thereby rendering the same OFF. The gate of the FET 5c is applied with voltage through the resistor 5a, so that the FET 5c is rendered ON and no signal is output from the charge current detecting section 4 even if the charge current is detected therein. In this manner, the battery charger 100 is configured so that the charge current cannot be detected when charging the battery 2a is permitted whereas the charge current can be detected when charging the battery 2a is not permitted.

The battery charger 100 further includes a switching section 6 and a switching control section 7. The switching section 6 is interposed between a switching power source (to be described later) and the battery pack 2. The switching control section 7 is connected to the switching section 6 to control the latter, and the battery temperature detecting section 3 is connected to the switching control section 7 to output either the high-level signal or low-level signal to the switching control section 7. The switching section 6 is provided for ON/OFF control of the power supply to the battery 2a from the switching power source. In this embodiment, the switching section 6 is configured from a relay. However, other switching elements can be used in the switching section 6. Whether the battery 2a is to be connected to the switching power source is controlled by the switching control section 7. In this embodiment, based on the signal from the battery temperature detecting section 3, the relay 8 is turned ON to allow power to be supplied to the battery 2a when charging the battery 2a is permitted. On the other hand, when charging the battery 2a is not permitted, the relay 8 is turned OFF so that the battery 2a is not supplied with power.

A first photocoupler 8 serving as signal transmitting means is provided for feeding back the charge voltage control signal and a charge current control signal flowing in the secondary rectifying/smoothing circuit 30 to a switching control IC 23.

The battery charger 100 further includes a switching control IC stop section 9 which is configured from a light emitting section 9a of a second photocoupler and an N-type FET 9b. The output of the charge current detecting section 4 is connected to the gate of the FET 9b. The light emitting section 9a and the FET 9b are connected between the positive line in the secondary side of a transformer 21 (to be described later) and ground. When the FET 9b is rendered ON, light is emitted from the light emitting section 9a and dully received at a light receiving section 26b in an associated switching control IC stop section 26.

As described previously, when charging the battery 2a is permitted, i.e., the relay 6 is turned ON, the charge current is detected by the charge current detecting section 4. However, the charge current detection controlling section 5 interrupts outputting a signal indicative of the charge current being detected by the charge current detecting section 4. On the other hand, when charging the battery is inhibited, i.e., the relay is turned OFF, the charge current detection controlling section 5 outputs a signal indicative of the charge current being detected by the charge current detecting section 4 if the charge current detecting section 4 should detect the charge current.

When the battery charger 100 is operating normally, the relay 6 is turned OFF when charging the battery 2a is not permitted. Thus, the charge current detecting section 4 does not detect the charge current. Nonetheless, the relay 6 is, for some reason, turned ON despite the fact that charging the battery 2a is not permitted, the battery 2a is unintentionally charged. The charge current detecting section 4 then detects the charge current and outputs a signal indicating the detection of the charge current. The signal output from the charge current detecting section 4 is applied to the gate of the FET 9b in the switching control IC stop section 9. The fact that the battery 2a is being accidentally or unintentionally charged is transmitted to the disabling section 26 through the second photocoupler 9a, 26b. As a consequence, a MOSFET 22 (to be described later) is disabled and further charging of the battery 2a is not continued. With such a configuration, stoppage of an unintentional or accidental charging of the battery 2a is ensured.

The battery charger 100 includes a primary side rectifying/smoothing circuit 10 configured from a full-wave rectifier 11 and a smoothing capacitor 12 connected across the full-wave rectifier 11. The battery charger 100 further includes a switching circuit 20 and a high frequency transformer 21. The switching circuit 20 includes a MOSFET 22, a switching control IC 23, a start-up resistor 24, a constant voltage circuit 25, and a disabling circuit 26.

The high frequency transformer 21 has a primary winding 21a, a secondary winding 21b, a tertiary winding 21c, and a quaternary winding 21d. An input voltage is applied to the primary winding 21a. An output voltage induced across the secondary winding 21b is applied to the switching control IC 23. An output voltage induced across the tertiary winding 21c is applied to the battery 2a for charging the same. The output voltage induced across the quaternary winding 21d is used for powering various parts of the battery charger 100, such as a constant voltage circuit 40. The polarity of the secondary and quaternary windings 21b, 21d is the same as that of the primary winding 21a, and the polarity of the tertiary winding 21c is opposite to that of the primary winding.

The switching control IC 23 is provided for adjusting the output voltage applied to the battery 2a by changing the width of a driving pulse applied to the gate of the MOSFET 22, known as a PWM control. The constant voltage circuit 25 is provided for supplying constant voltage to the switching control IC 23 and is configured from a diode 25a, a capacitor 25b, a resistor 25c, a transistor 25d, and a Zenor diode 25e. Normally, the switching control IC 23 is applied with a voltage equal to the sum of the voltage developed across the Zenor diode 25e and the base-emitter bias voltage of the transistor 25d. The switching control IC 23 performs switching actions for such a voltage applied thereto. The Zenor diode 25e must show relevant Zenor voltage as the power source voltage for the switching control IC 23.

The disabling circuit 26 is provided for disabling the switching control IC 23 and configured from a resistor 26a, a light receiving section 26b of the second photocoupler, a Zenor diode 26c, a P-type FET 26d, and N-type FETs 26e, 26f. The light emitting section 9a of the second photocoupler includes an LED and the light receiving section 26b includes a phototransistor. Normally, the disabling circuit 26 is not active. When the phototransistor in the light receiving section 26b receives light from the LED and is turned on in response to a signal produced from the disabling circuit 9, the voltage on an AC line rectified by the rectifying diode 11 is applied to the Zenor diode 26c through the resistor 26a. Then, voltage corresponding to the Zenor voltage of the Zenor diode 26c is applied to the gate of the FET 26e, thereby rendering the FET 26e ON. When the FET 26e is rendered ON, the FET 26d is in turn rendered ON due to the potential between the gate and drain of the FET 26d. Simultaneously, the FET 26f is rendered ON by the voltage corresponding to the Zenor voltage of the Zenor diode 26f applied to the gate of the FET 26f. The switching control IC 23 is applied with relevant voltage and thus in operation.

As described previously, the voltage applied to the switching control IC 23 is equal to the sum of the voltage developed across the Zenor diode 25e and the base-emitter bias voltage (0.6V) of the transistor 25d. The Zenor diode 26f is short-circuited resulting from the FET 26f being rendered ON. As a result, the voltage applied to the switching control IC 23 falls to a level around 0.6V. When the voltage applied to the switching control IC 23 falls below the relevant voltage necessary for operating the switching control IC 23, the switching control IC 23 stops the switching actions in due course. When the switching action is stopped, the light transmitting section 9b of the second photocoupler does no longer emit light toward the light receiving section, so that the FET 26f is rendered OFF again. Then, the switching control IC 23 is placed in an operating condition as the same is applied with the sum voltage of the voltage across the Zenor diode 25e and the base-emitter bias voltage (0.6V) of the transistor 25d. According to this embodiment, however, once the phototransistor in the light receiving section 26b of the second photocoupler is turned on, the FETs 26d, 26e, 26f are rendered ON by utilizing the voltage on the AC line regardless of whether the phototransistor of the second photocoupler is ON or OFF. Accordingly, insofar as the voltage on the AC line is not lowered to a great extent, the FET 26f is maintained at an ON state, thereby prohibiting the switching control IC 23 from being operated.

A second rectifying/smoothing circuit 30 is connected to the tertiary winding 21c of the transformer 21. The circuit 30 is configured from diode 31, smoothing capacitor 32, and resistor 33. The output of the second rectifying/smoothing circuit 30 is connected to the battery pack 2 for charging the battery 2a. A constant voltage circuit 40 is connected to the quaternary winding 21d. The constant voltage circuit 40 is configured from diode 41, three-terminal regulator 43, and capacitors 42, 44 and serves as a power source for the operational amplifiers in the battery charger 100.

A display section 50 is provided for displaying a charging status. In this embodiment, the display section 50 includes an LED which is lit during charging and is distinguished when charging is not performed. In response to the output of the temperature detecting section 3, the LED is either lit or distinguished.

A charge current controlling section 60 is provided for controlling the level of the charge current to be supplied to the battery 2a, and configured from resistors 60a, 60b, 60c, 60d, 60e, 60f, operational amplifier 60g, diode 60h and shunt resistor 60i. A charge current control signal is produced by the charge current controlling section 60 and fed back to the switching control IC 23 through the first photocoupler 8.

Power source voltage (Vcc) is applied between the serially connected resistors 60a and 60b, and the voltage difference between the voltage developed across the resistor 60b and the voltage drop at the shunt resistor 60i is divided by the resistors 60c and 60d. Voltage at a junction between the resistors 60c and 60b is applied to the inverting input terminal of the operational amplifier 60g. A voltage corresponding to the charge current is applied to the non-inverting input terminal of the operational amplifier 60g through the resistor 60e. The level of the charge current is controlled to be a target value when the difference between the voltages applied to the inverting and non-inverting input terminals becomes zero.

A charge voltage controlling section 70 is connected between the positive line of the charge path and the first photocoupler for controlling the level of the charge voltage to be applied to the battery 2b. The charge voltage controlling section 70 is configured from resistor 70a and Zenor diode 70b. The charge voltage is determined by the Zenor voltage. Similar to the charge current, the charge voltage is controlled by feeding back a voltage control signal to the switching control IC 23 through the first photocoupler 8.

Figure 2:
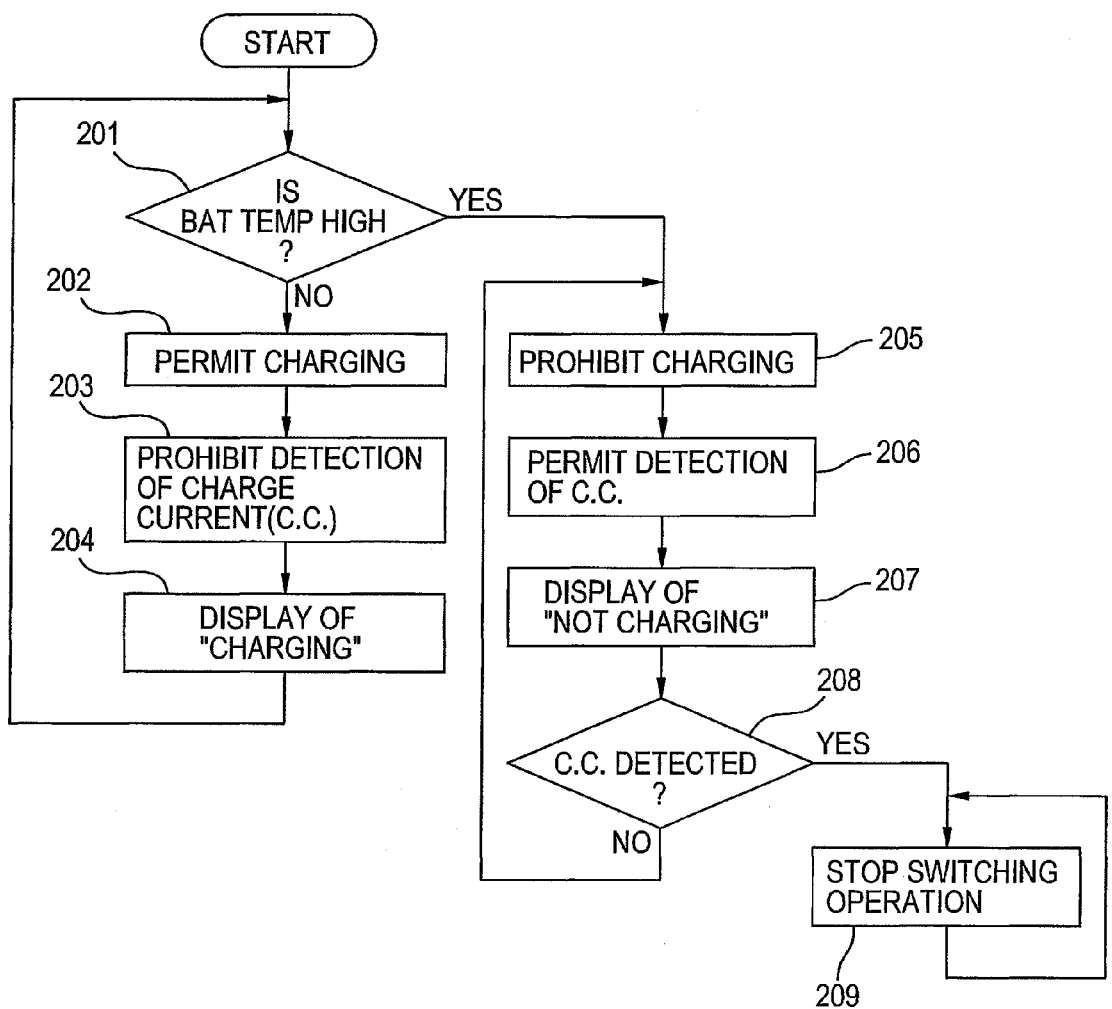
FIG. 2 is a flowchart illustrating operation of the battery charger shown in FIG. 1.

Referring to the flowchart shown in FIG. 2, operation of the battery charger configured as described above will be described. First, with the battery temperature detecting section 3, whether the battery temperature has reached a predetermined value or not is determined (step 201). When the determination made in step 201 indicates that the battery temperature has not yet reached the predetermined value, the battery temperature detecting section 3 outputs the low-level signal to indicate that charging the battery 2 is permitted (step 202).

As described previously, when charging the battery 2a is permitted, the charge current detection controlling section 5 prohibits detection of the charge current based on the signal fed from the battery temperature detecting section 3 (step 203). Concurrently, the display section 50 indicates that the charging is being processed based on the signal fed from the battery temperature detecting section 3 (step 204).

When determination made in step 201 indicates that the battery temperature is equal to or above the predetermined value, the battery temperature detecting section 3 outputs the high-level signal to thereby prohibit charging the battery 2b (step 205). At this time, the charge current detection controlling section 5 permits detection of the charge current based on the signal from the battery temperature detecting section 3 (step 206). The display section 50 indicates that charging the battery is not performed (step 207). The charge current detecting section 4 then determines whether or not the charge current is detected (step 208). When the charge current is not detected, the routine returns to step 205. Detection of the charge current in step 208 implies that malfunction has been occurred, because the charge current is detected despite the fact that charging the battery 2a is prohibited. When it is the case, switching actions by the FET 22 are stopped by the switching control IC stop section 9.

According to the embodiment described above, the battery temperature detecting section 3 is used to detect the connection of the battery pack 2 to the battery charger 100. The section 3 is also used to detect a fully charged condition of the battery 2a. The section 3 is further configured to operate the switching control section 7 for controlling ON/OFF of the relay 6. In lieu of the battery temperature detecting section 3, a battery voltage detecting section may be provided for detecting the voltage across the battery 2a, and detections of the battery pack connection and the fully charged condition of the battery 2a may be performed based on the detected battery voltage.

In the above-described embodiment, the secondary side rectifying/smoothing circuit 30 serves as a charge circuit for charging the battery 2a. The charge current detecting section 4 and the charge current detection controlling section 5 serve as a current detecting section for detecting current flowing in the charge circuit when charging the battery 2a has been stopped. The switching IC stop section 9 serves as a signal outputting section for outputting an abnormality signal when the current detecting section (4, 5) detects the current. The disabling circuit 26 serves as an interrupting section for interrupting power supply to the charge circuit (30) based on the abnormality signal output from the signal outputting section (9).

The battery temperature detecting section 3 serves as a battery detecting section for detecting that the battery 2b is connected to the battery connecting section 80. The current detecting section detects the current flowing in the charge circuit when detection made by the battery detecting section indicates that the battery 2b is not connected to the battery connecting section 80. The relay 6 and its associated switching control section 7 serve as a charge stop section for stopping charging the battery 2a depending upon the temperature detected by the temperature detecting section which detects the temperature of the battery 2a. The current detecting section detects the current flowing in the charge circuit when the charge stop section stops charging the battery 2a. The battery temperature detecting section 3, relay 7 and switching control section 7 in combination serve as a charge changeover section for changing over a charge condition to a charge stop condition and vice versa wherein the battery 2a is charged by the charge circuit in the charge condition whereas the battery 2a is not charged in the charge stop condition. The switching circuit 20 also serves as an interrupting section for interrupting power supply to the charge circuit based on the abnormality signal output from the signal outputting section.

The primary side rectifying/smoothing circuit 10, switching circuit 20, transformer 21, and secondary side rectifying/smoothing circuit 30 in combination serve as a switching power source for supplying power to the battery 2a to be recharged. The battery temperature detecting section 3 also serves as a charge on/off determining circuit for determining whether to charge the battery 2a based on qualitative information (battery temperature in this case) of the battery 2a. The first photocoupler 8, MOSFET 22 and its associated switching control section 23 serve as a disabling section for disabling the switching power source when the charge current detecting circuit detects the charge current. When the charge on/off determining circuit determines to charge the battery 2a, the charge current detection controlling section 5 does not allow the charge current detecting section 4 to perform detection of the charge current whereas when the charge on/off determining circuit determines not to charge the battery 2a, the charge current detection controlling section allows the charge current detection section to perform detection of the charge current.

Although the present invention has been described with respect to specific embodiments, it will be appreciated by one skilled in the art that a variety of changes may be made without departing from the scope of the invention.

What is claimed is:

1. A battery charger comprising:
    a battery connecting section to which a secondary battery to be recharged is connectable;
    a charge circuit configured to charge the secondary battery;
    a current detecting section configured to detect current flowing in the charge circuit while charging the secondary battery has been prohibited;
    a first signal outputting section configured to output a signal to prohibit charging when a charging parameter is detected; and
    a second signal outputting section configured to output an abnormality signal when the current detecting section detects the current while charging the secondary battery has been prohibited.

2. The battery charger according to claim 1, further comprising an interrupting section configured to interrupt power supply to the charge circuit based on the abnormality signal output from the second signal outputting section.

3. The battery charger according to claim 1, further comprising a battery detecting section configured to detect that the secondary battery is connected to the battery connecting section,
    wherein the current detecting section detects the current flowing in the charge circuit when detection made by the battery detecting section indicates that the secondary battery is not connected to the battery connecting section.

4. The battery charger according to claim 2, further comprising a battery detecting section configured to detect that the secondary battery is connected to the battery connecting section,
    wherein the current detecting section detects the current flowing in the charge circuit when detection made by the battery detecting section indicates that the secondary battery is not connected to the battery connecting section.

5. The battery charger according to claim 1, wherein the first signal outputting section comprises:
    a temperature detecting section configured to detect temperature of the secondary battery; and
    a charge stop section configured to prohibit charging the secondary battery depending upon the temperature detected by the temperature detecting section,
    wherein the current detecting section detects the current flowing in the charge circuit while the charge stop section stops charging the secondary battery.

6. The battery charger according to claim 2, wherein the first signal outputting section comprises:
    a temperature detecting section configured to detect temperature of the secondary battery; and
    a charge stop section configured to prohibit charging the secondary battery depending upon the temperature detected by the temperature detecting section,
    wherein the current detecting section detects the current flowing in the charge circuit while the charge stop section prohibits charging the secondary battery.

7. The battery charger according to claim 1, wherein the current detecting section is prohibited from detecting current flowing in the charge circuit while charging the secondary battery has been permitted.

* * * * *